(12) United States Patent
Soles et al.

(10) Patent No.: US 12,575,504 B2
(45) Date of Patent: Mar. 17, 2026

(54) COVER-AFTER PILE GRAIN COVER

(71) Applicant: Soles Enterprises, Inc, Brandon, SD (US)

(72) Inventors: Ben Soles, Brandon, SD (US); Ralph Soles, III, Brandon, SD (US)

(73) Assignee: SOLES ENTERPRISES, INC, Brandon, SD (US)

( * ) Notice: Subject to any disclaimer, the term of this patent is extended or adjusted under 35 U.S.C. 154(b) by 264 days.

(21) Appl. No.: 18/600,012

(22) Filed: Mar. 8, 2024

(65) Prior Publication Data

US 2025/0280766 A1 Sep. 11, 2025

(51) Int. Cl.
| | |
|---|---|
| *A01F 25/13* | (2006.01) |
| *B65G 3/02* | (2006.01) |
| *B65G 3/04* | (2006.01) |
| *E04H 7/22* | (2006.01) |

(52) U.S. Cl.
CPC ............... *A01F 25/13* (2013.01); *B65G 3/02* (2013.01); *B65G 3/04* (2013.01); *E04H 7/22* (2013.01)

(58) Field of Classification Search
CPC .. A01F 25/13; B65G 3/02; B65G 3/04; E04H 7/22
USPC ........ 52/3, 5, 66, DIG. 12, DIG. 14; 135/90; 150/154
See application file for complete search history.

(56) References Cited

U.S. PATENT DOCUMENTS

| | | | | |
|---|---|---|---|---|
| 2,804,897 A | * | 9/1957 | Wunderwald | .......... B65D 88/16 383/102 |
| 4,454,807 A | * | 6/1984 | Wolstenholme | ......... B65G 3/02 414/919 |
| 4,493,248 A | * | 1/1985 | Wolstenholme | ......... B65G 3/02 366/101 |
| RE32,536 E | * | 11/1987 | Wolstenholme | ......... B65G 3/02 414/919 |
| 11,412,664 B2 | * | 8/2022 | Soles | ..................... B65G 65/28 |
| 12,035,660 B2 | * | 7/2024 | Soles | ..................... A01F 25/13 |
| 2016/0010354 A1 | * | 1/2016 | Gaudet, III | ............. B32B 5/024 428/221 |
| 2016/0237710 A1 | * | 8/2016 | Gaudet, Jr. | ................ E04H 7/22 |
| 2022/0183233 A1 | * | 6/2022 | Soles | ................... B65G 69/181 |
| 2022/0386536 A1 | * | 12/2022 | Soles | ..................... B65G 3/02 |
| 2024/0206401 A1 | * | 6/2024 | Soles | ..................... A01F 25/13 |

* cited by examiner

*Primary Examiner* — Robert Canfield
(74) *Attorney, Agent, or Firm* — Goodhue, Coleman & Owens, P.C.

(57) ABSTRACT

A cover-after grain tarp is disclosed. The cover-after grain tarp includes, for example, a tarp body having a plurality of tarp sections joined together at one or more seams, each tarp section comprising a plurality of tarp panels having an outer terminal edge spaced between opposing converging edges and an edge panel secured along its length to an adjoining one of the plurality of tarp panels. The edge panel is configured for securing to hardware of a center tower structure at a grain storage location.

20 Claims, 15 Drawing Sheets

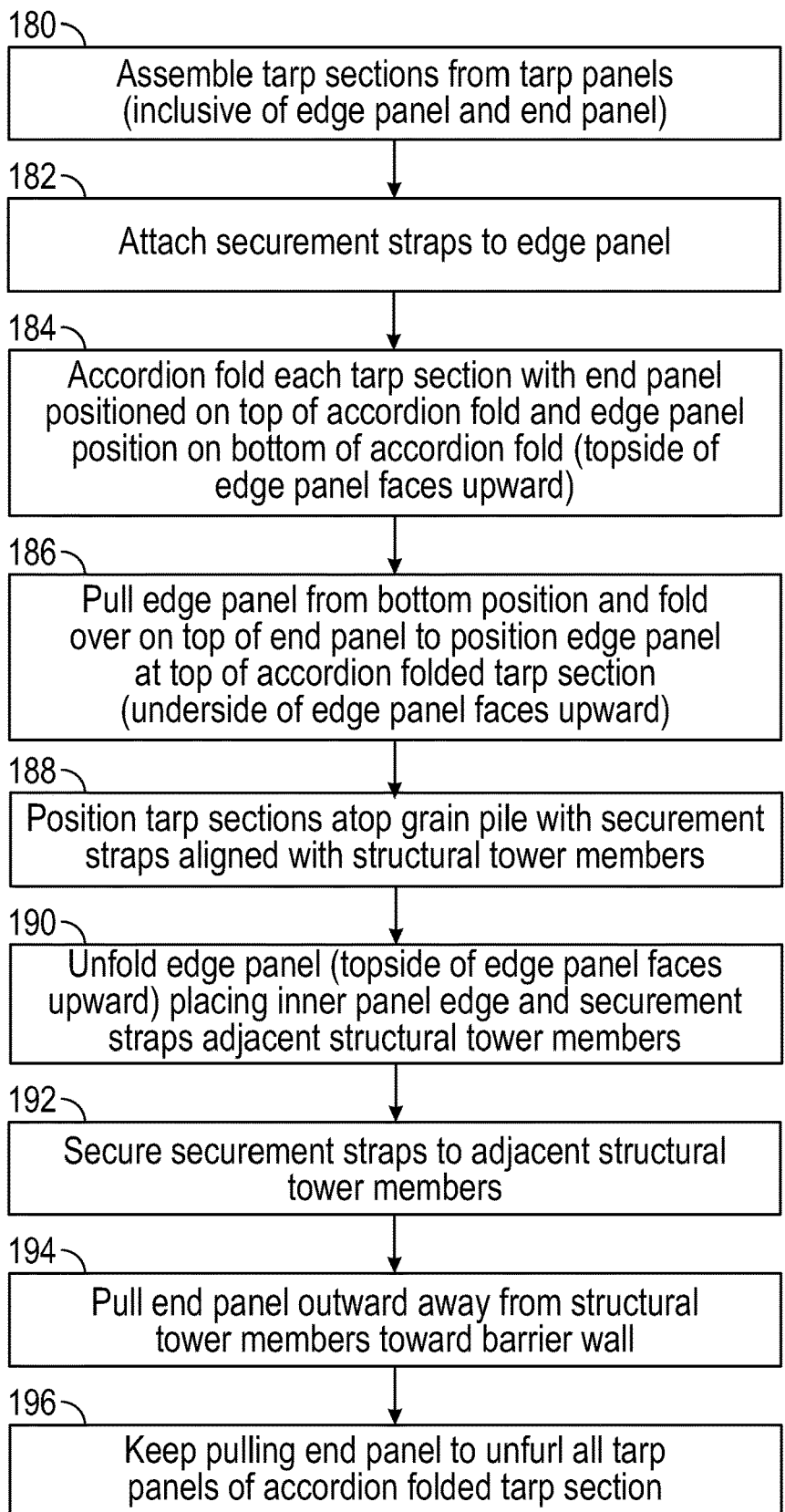

180 — Assemble tarp sections from tarp panels (inclusive of edge panel and end panel)

182 — Attach securement straps to edge panel

184 — Accordion fold each tarp section with end panel positioned on top of accordion fold and edge panel position on bottom of accordion fold (topside of edge panel faces upward)

186 — Pull edge panel from bottom position and fold over on top of end panel to position edge panel at top of accordion folded tarp section (underside of edge panel faces upward)

188 — Position tarp sections atop grain pile with securement straps aligned with structural tower members 190 — Unfold edge panel (topside of edge panel faces upward) placing inner panel edge and securement straps adjacent structural tower members 192 — Secure securement straps to adjacent structural tower members 194 — Pull end panel outward away from structural tower members toward barrier wall 196 — Keep pulling end panel to unfurl all tarp panels of accordion folded tarp section

FIG. 12

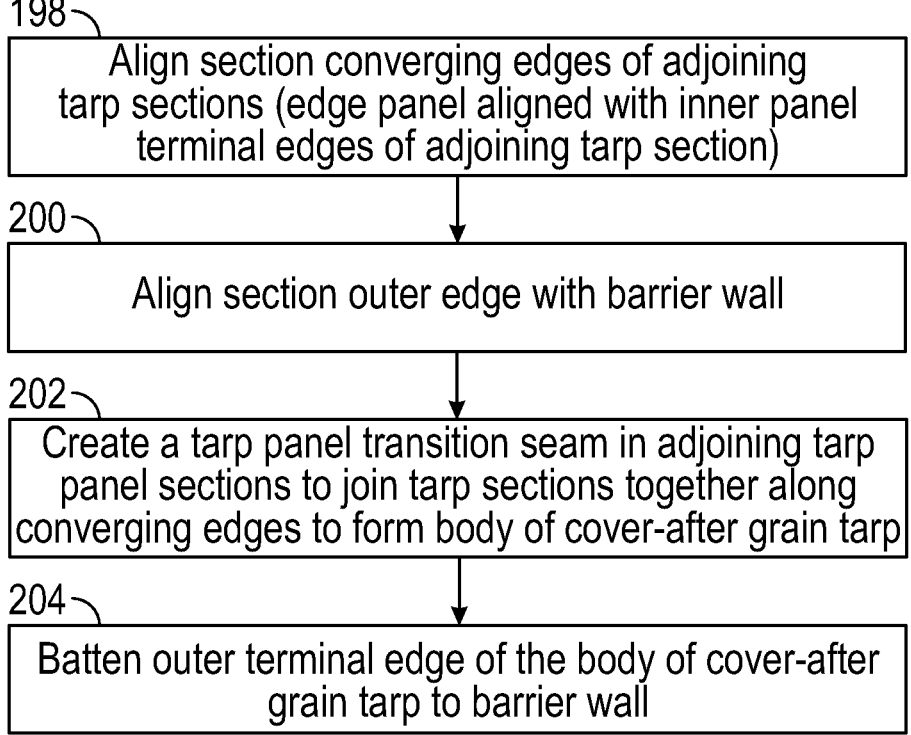

198
Align section converging edges of adjoining
tarp sections (edge panel aligned with inner panel
terminal edges of adjoining tarp section)

200
Align section outer edge with barrier wall

202
Create a tarp panel transition seam in adjoining tarp
panel sections to join tarp sections together along
converging edges to form body of cover-after grain tarp 204
Batten outer terminal edge of the body of cover-after
grain tarp to barrier wall

FIG. 13

COVER-AFTER PILE GRAIN COVER

FIELD OF THE DISCLOSURE

The present disclosure relates to a cover for temporarily storing agricultural grains. More particularly, but not exclusively, the present disclosure relates to a cover-after grain cover or yokeless cover-after grain cover, such as a tarp, for covering piles of agricultural grains.

BACKGROUND

Coverings, such as cover-after grain tarps, are used to cover grain (e.g., corn, soybean, milo, and wheat) that is temporarily stored at a grain storage site or other suitable locations. In the case of a cover-after tarp, the tarp is typically installed at the grain storage site over the grain pile. The cover-after grain cover generally takes the shape of the pile it covers. For example, in the case of round piles, cover-after grain covers are generally conical in shape and used to cover a generally conically shaped pile of grain. Grain cover tarps typically have seams joining several sections of material and transitional seams joining materials can be different by type, thickness, and quality. Collectively these materials form an assembled grain covering. Stresses carried by the grain cover can cause failure at seams, in the body of a single material, and between different components and/or assembled materials. For example, the yoke portion of a tarp is often difficult to manufacture and more likely to fail itself and/or at its one or more seams. Moreover, a cover's design, material components, and material strengths and cost can be a significant driver in the weight, construction, assembly, and installation of cover-after grain covers. Material and design changes in cover-after round piles can drastically affect installation, usability, and durability of the cover. Options for securing a cover can vary based on the type and availability of materials, design, and construction of the cover and installation location. Installing a cover as well as properly and adequately securing the cover to available structure at the installation location can be challenging. Therefore, what is needed is a cover-after grain cover that addresses these and other deficiencies in the cover-after grain cover industry.

SUMMARY

Therefore, it is a primary object, feature, or advantage of the present disclosure to improve over the state of the art.

It is a further object, feature, or advantage of the present disclosure to provide a grain cover that is configured to address and remedy material and seam failures in existing grain covers.

It is a still further object, feature, or advantage of the present disclosure to provide a cover-after grain cover that increases manufacturability and decreases material costs.

Another object, feature, or advantage is to provide a cover-after grain cover that reduces the chances of failure by better distributing stresses carried by the material and seams.

Yet another object, feature, or advantage is to provide a cover-after grain cover that decreases the time, labor, and potential for problems during installation.

Still another object, feature, or advantage is to provide a cover-after grain cover that includes features for easily securing the cover to structures at the grain pile, such as one or more structural members of a center tower.

It is yet a further object, feature, or advantage to provide a cover-after grain cover that is manufactured and assembled for increasing the ease and success of installation.

It is still a further object, feature, or advantage to provide a cover-after grain cover that is a yokeless cover-after grain cover.

It is another object, feature, or advantage to provide a cover-after grain cover that reduces the number of failure points and cost by being a yokeless cover-after grain cover.

At least one other object, feature, or advantage is to provide a cover-after grain cover that uses edge panels having different material characteristics to better carry and distribute stresses at seams and connection points for increasing the durability and longevity of the cover.

According to at least one aspect, a cover-after grain tarp is disclosed. The cover-after grain tarp includes, for example, a tarp body having a plurality of tarp sections joined together at one or more transition seams, each tarp section includes a plurality of tarp panels having an outer terminal edge spaced between opposing converging edges and an edge panel of each of the plurality of tarp sections is secured along a transition seem to a converging edge of an adjoining one of the plurality of tarp panels in each of the plurality of tarp sections. The edge panel is configured for securing to one or more structural members of a tower structure at a grain storage location.

According to at least one other aspect, a yokeless cover-after grain tarp is disclosed. The yokeless cover-after grain tarp includes, for example, a tarp body having a plurality of tarp sections joined together at one or more transition seams, each tarp section includes a plurality of tarp panels having an outer terminal edge spaced between opposing converging edges and an edge panel of each of the plurality of tarp sections secured along a transition seam to an adjoining one of the plurality of tarp panels and the transition seam extending generally between the outer terminal edge and opposing converging edge of the adjoining one of the plurality of tarp panels. The edge panel is configured for securing to one or more structural members of a tower structure at a grain storage location.

According to another aspect, a method for a yokeless cover-after grain tarp is disclosed. The method for a yokeless cover-after grain tarp includes, such steps as, for example, providing a tarp body having a plurality of tarp sections with a plurality of tarp panels having an outer terminal edge spaced between opposing converging edges and each of the plurality if tarp sections having a transition seam connecting an edge panel to an adjoining one of the plurality of tarp panels and securing the edge panel to one or more structural members of a center tower structure at a grain storage location for securing the tarp body.

One or more of these and/or other objects, features, or advantages of the present disclosure will become apparent from the specification and claims that follow. No single aspect need provide each and every object, feature, or advantage. Different aspects may have different objects, features, or advantages. Therefore, the present disclosure is not to be limited to or by any objects, features, or advantages stated herein.

BRIEF DESCRIPTION OF THE DRAWINGS

Illustrated aspects of the disclosure are described in detail below with reference to the attached drawing figures, which are incorporated by reference herein, and where:

FIG. 12 is a pictorial representation of a flow diagram illustrating a method for assembling and installing a cover-after grain tarp; and FIG. 13 is a pictorial representation of another flow diagram illustrating a method for assembling and installing a yokeless cover-after grain tarp.

DETAILED DESCRIPTION

Figure 1A:
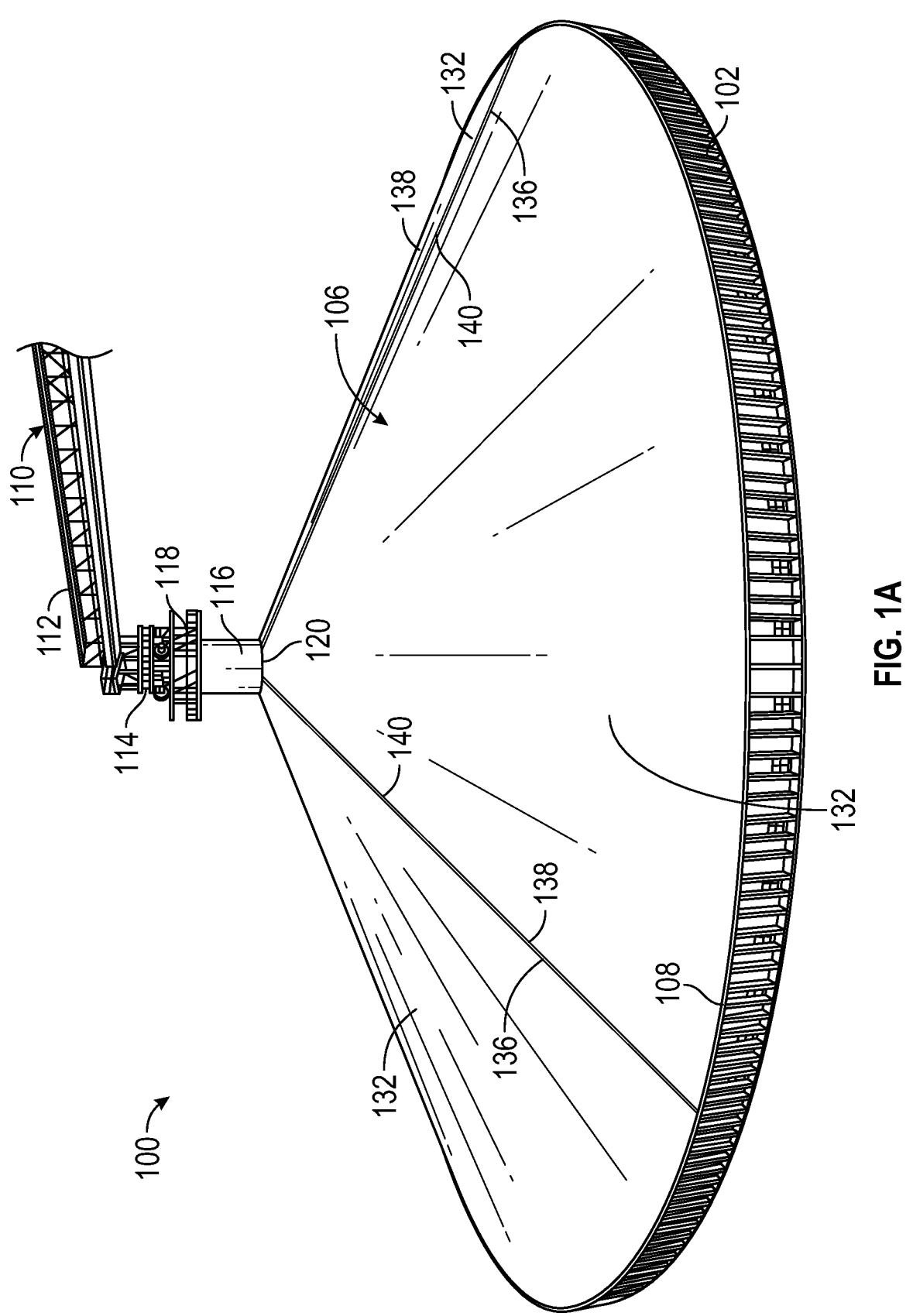
FIG. 1A is a pictorial representation showing a cover-after grain tarp in accordance with an exemplary aspect of the present disclosure.

FIGS. 1-13 illustrate exemplary aspects of a cover-after grain tarp 100 and methods of installation of the same also referred herein as a cover-after grain cover and a yokeless cover-after grain tarp/cover and their installation methods used for covering piles of stored grain (e.g., corn, soybean, milo, and wheat). Types of cover-after grain tarp 100 materials and thicknesses can vary. Material selection and thickness can depend on a range of factors, such as, for example, the use environment, application, desired life and durability, cost, and the material location (e.g., edge panel, tarp body, tarp panels, etc.) within the cover-after grain tarp 100.

Cover-after grain tarp 100 is generally used in combination with a barrier wall 102 for forming a bunker 104 for housing a grain pile 105. An outer terminal edge 108 of the body 106 of the tarp 100 may be secured to the barrier wall 102 for covering grain pile 105 underneath and securing cover-after grain tarp 100 atop grain pile 105. In at least one aspect, outer terminal edge 108 is approximated by the collective outer edges of each tarp panel 142. Barrier wall 102 is typically constructed from concrete or steel for forming bunker 104. Battening (not shown) is generally attached to the upper portion of barrier wall 102 for securing outer terminal edge 108 of cover-after grain tarp 100 to the barrier wall 102.

Grain is introduced into bunker 104 to create grain pile 105 surrounded and supported in a generally conical, vertically rising shape by barrier wall 102. In many instances, grain is introduced into bunker 104 using a grain conveyor 110 supported by one or more (generally horizontal) structural conveyor members 112 and one or more (generally vertical) structural tower members 114. Grain travels on grain conveyor 110 supported by structural conveyor members 112 and descends vertically through structural tower members 118 thereby forming conical grain pile 105 within bunker 104. Cover-after grain tarp 100 is installed after bunker 104 is full and grain pile 105 is completely formed.

Center tower skirt 116, which grain is fed through into conically shaped grain pile 105 below, may be secured around structural tower members 114. Center tower skirt 116 is generally shaped to a configuration or collective shape of the structural tower members 114. Center tower skirt 116 has an outer circumference extending between an upper edge 118 and a lower edge 120. The upper edge 118 of the center tower skirt 116 is operably secured to the structural tower members 114 and/or structural conveyor members 112. The lower edge 120 of the center tower skirt 116 is operably secured to the structural tower members 114.

Grain pile 105 within bunker 104 is generally conical in shape and generally has a preferred angle, or an angle of repose for the specific type of grain material, of approximately 21 degrees or thereabout relative to a horizontal plane, when the bunker 104 is full. The angle can vary, such as, for example, less than 21 degrees (e.g., 18, 19, 20 degrees) or more than 21 degrees (e.g., 22, 23, 24 degrees).

The center tower skirt 116 can be an optional feature based on the type of grain conveyor 110 system at bunker 104. For example, a center tower formed from structural tower members 114 may include mechanical steel doors instead of center tower skirt 116 for distributing grain at different elevations along the vertical length of structural tower members 114. As best illustrated in FIG. 1B, structural tower members 114 may be configured as a center tower structure with a top end 124 operably secured to structural conveyor members 111 and a bottom end 126 operably supported by a structural support pad 128 configured atop ground surface 130. In this configuration, grain travels along conveyor 110 supported by structural conveyor members 112 and is fed through structural tower members 114, from the top end 124 toward the bottom end 126 forming conically shaped grain pile 105 expanding horizontally outward toward barrier wall 102 and vertically upward toward structural conveyor members 112.

The body 106 of tarp 100 may be assembled from multiple tarp sections 132 of a singular type of tarp material, which are typically separately manufactured and joined at a tarp section seam 140 during an assembly process to form the cover-after grain tarp 100. Different types of tarp material may be used for multiple tarp sections 132 and joined at a tarp section transition seam 140. Although quarter (four) tarp sections 132 are shown, the present disclosure contemplates multiple tarp sections 132 forming body 106 of tarp 100, such as a number of tarp sections 132 more or less than the number of tarp sections 132 shown. In one aspect, body 106 of tarp 100 may include four or less tarp sections 132. In another aspect, body 106 may include 4 or more tarp sections 132. Each tarp section 132 has a section outer edge 134 spaced between section converging edges 136, 138. The section outer edge 134 forms a portion, such as a quarter portion, of outer terminal edge 108 of body 106 of tarp 100. Section outer edge 134 for each tarp section 132 is generally formed by outer panel terminal edges 156 and portions of outer panel edges 152, wherein the lengths of the portions of outer panel edges 152 increase with the increasing distance of each tarp panel 142 from section converging edge 136. Section converging edge 136 is formed by inner panel edge 154 of edge panel 144. Section converging edge 138 of each tarp section 132 is formed by the combined inner panel terminal edge 158 of edge panel 144, inner panel terminal edges 158 of adjoining tarp panels 142, and inner panel terminal edge 158 of end panel 145.

Grain cover tarps may include a yoke (not shown) with a center opening surrounding and connected to center tower skirt 116, while outer edges of the yoke are connected to each tarp section. Cover-after grain tarp 100 is yokeless, meaning the body of the tarp includes no yoke or yoke materials, there is no yoke or yoke materials surrounding and connected to center tower skirt 116, and there is no yoke or yoke materials connected to quarter tarp sections 132 of tarp 100. The body 106 of the tarp 100 is further detailed in the proceeding description.

For purposes of the disclosure, a seam is defined as the joint between and joining of two of the same types of material, whereas a transition seam is defined as the joint between and the joining of two different types of material. Joints between two types of the same or different materials can be joined or connected using stitching, a heat weld (i.e., welding together with heat), and/or securing together with an adhesive, securement straps, or other means appropriate for types of material being joined together.

Figure 2:
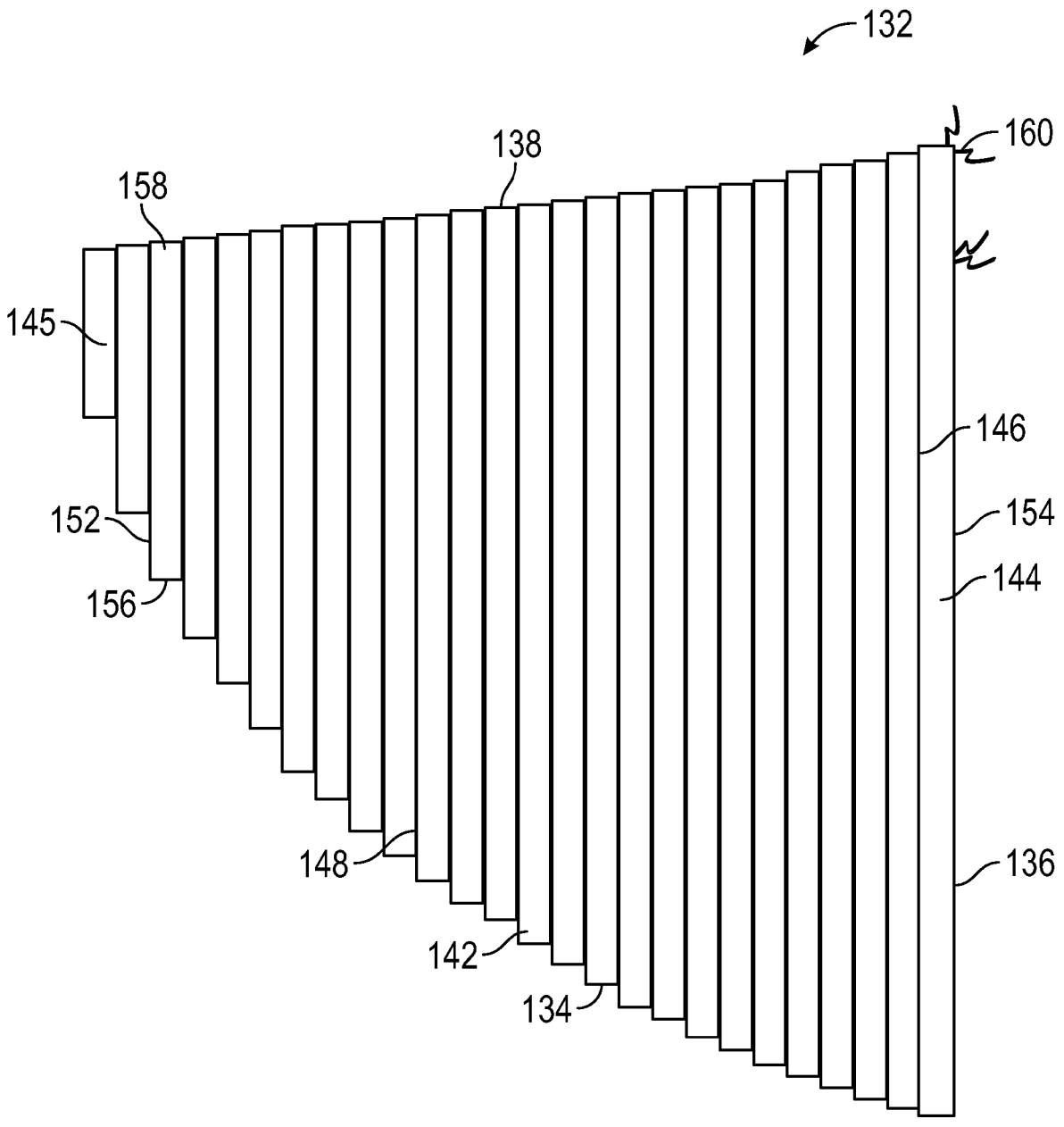
FIG. 2 is a pictorial representation of a section of a cover-after grain tarp.

For example, FIG. 2 provides an illustration presenting a tarp quarter section 132 of the body 106 of a cover-after grain tarp 100 for simplification purposes. In a preferred aspect, the other sections of body 106 of tarp 100 are identical (e.g., see, for example, FIGS. 7-8) and thus are not illustrated in FIG. 2. In another aspect, the other sections of the body 106 of the tarp 100 can be configured differently from one another, if and as needed. Tarp quarter section 132 of tarp 100, as shown in FIG. 2, is constructed from a series of individual tarp panels 142 (see also FIG. 12, Step 180). In one aspect, one of the series of individual tarp panels 142 can be an edge panel 144. In one aspect, one of the series of individual tarp panels 142 can be an end panel 145. In one aspect, tarp section 132 can be assembled with the outermost tarp panel 142 of each tarp section 132 being edge panel 144 and the innermost tarp panel 142 of each tarp section 132 being end panel 145 (see also FIG. 12, Step 180). Each tarp panel 142, each edge panel 144, and each end panel 145 includes an outer panel edge 152 and an inner panel edge 154 spaced between an outer panel terminal edge 156 and an inner panel terminal edge 158. Each tarp panel 142, each edge panel 144, and each end panel 145 have a panel length defined between their opposing outer panel terminal edge 156 and inner panel terminal edge 158. Each tarp panel 142, each edge panel 144, and each end panel 145 have a panel width defined between their opposing outer panel edge 152 and inner panel edge 154. The width of each tarp panel 142, each edge panel 144, and each end panel 145 can be the same. In another aspect, the width of one or more tarp panels 142, edge panel 144, or end panel 145 in a tarp section 132 can be different. Each tarp panel 142 (inclusive of end panel 145) decreases in length with its increasing distance from section converging edge 136 thereby converging section outer edge 134 and section converging edge 138. Outer edge 134 of each tarp section 132 approximates a portion of the circumference of barrier wall 102. In at least one aspect, the convergence of section converging edges 136 and 138 is less than a 90-degree portion of the circumference of a tarp quarter section 132 for best approximating the conical shape of grain pile 105 while aligning section outer edge with barrier wall 102. In other words, the angle between section converging edges 136 and 138 is less than 90-degrees for best approximating the conical shape of grain pile 105 while aligning section outer edge with barrier wall 102. Snugly fitting each tarp quarter section 132 and thereby body 106 of cover-after grain tarp 100 to the topography of grain pile 105 results in the least amount of excess or slack tarp material, which decreases costs and the potential for tarp material failure or seam failure as a result of a maldistribution of stresses across a tarp panel transition seam 146, tarp panel seam 148, tarp panel 142, edge panel 144, end panel 145, tarp section 142, and/or body 106 of cover-after grain tarp 100. Although a tarp section having an angle less than 90 degrees between section converging edges 136 and 138 is shown, the present disclosure contemplates angles greater than 90 degrees, if and as needed, to accommodate grain piles of varying shapes, such as a grain pile having a grain pile angle less than the angle of repose.

Adjoining tarp panels 142 (inclusive of edge panel 144 and end panel 145) in each tarp section 132 are connected along their respective outer panel edge 152 and inner panel edge 154 generally between outer panel terminal edge 156 and inner panel terminal edge 158. In one aspect, each successive adjoining tarp panel 142 (inclusive of edge panel 144 and end panel 145) in each tarp section 132 are generally shorter in length. As a result, outer portions of outer panel edges 152 of each tarp panel 142 (inclusive of edge panel 144 and end panel 145) generally adjacent section outer edge 134 are unconnected to outer portions of inner panel edges 154 of each tarp panel 142 (inclusive of edge panel 144 and end panel 145) generally adjacent section outer edge 134. The length of unconnected portions can be configured to increase with the increasing distance of each tarp panel 142 from section converging edge 136. Adjoining tarp panels 142 (inclusive of edge panel 144 and end panel 145) in each tarp section 132 are connected along their respective inner panel edge 154 and outer panel edge 152 generally between outer panel terminal edge 156 and inner panel terminal edge 158. Adjoining tarp panels 142 (inclusive of end panel 145) are connected by a tarp panel seam 148. An adjoining tarp panel 142 of one type of tarp material and edge panel 144 of another type of tarp material are connected by a tarp panel transition seam 146. In another aspect, an adjoining tarp panel 142 of one type of tarp material and edge panel 144 and end panel 145 of same type of tarp material are connected by a tarp panel seam 146. In at least one aspect, edge panel 144 is longer than tarp panels 142 (inclusive of end panel 145) in each tarp section 132. In at least one aspect, end panel 145 is shorter than tarp panels 142 and edge panel 144 in each tarp section 132. Outer panel edge 152 of end panel 145 can be configured as a terminal outer edge forming a portion of section outer edge 134 for each tarp section 132. Additionally, as shown in FIG. 2, end panel 145 is another one of tarp panels 142 and of the same material. In at least one other aspect, end panel 145, like edge panel 144, can be of a different type of tarp material than tarp panels and connected to the adjoining tarp panel 142 by a tarp panel transition seam 146.

Figure 3A:
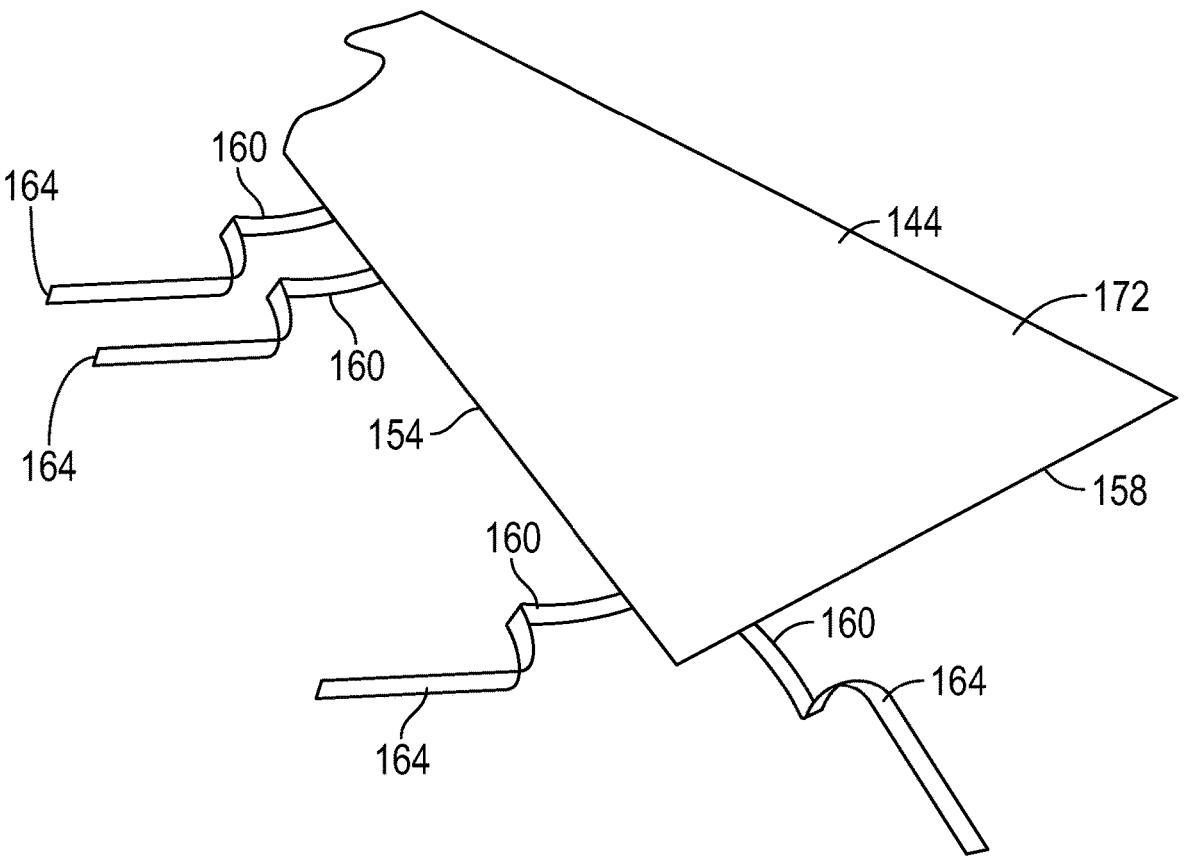
FIG. 3A is a pictorial representation of top side of an edge panel and securement straps of a cover-after grain tarp.
Figure 3B:
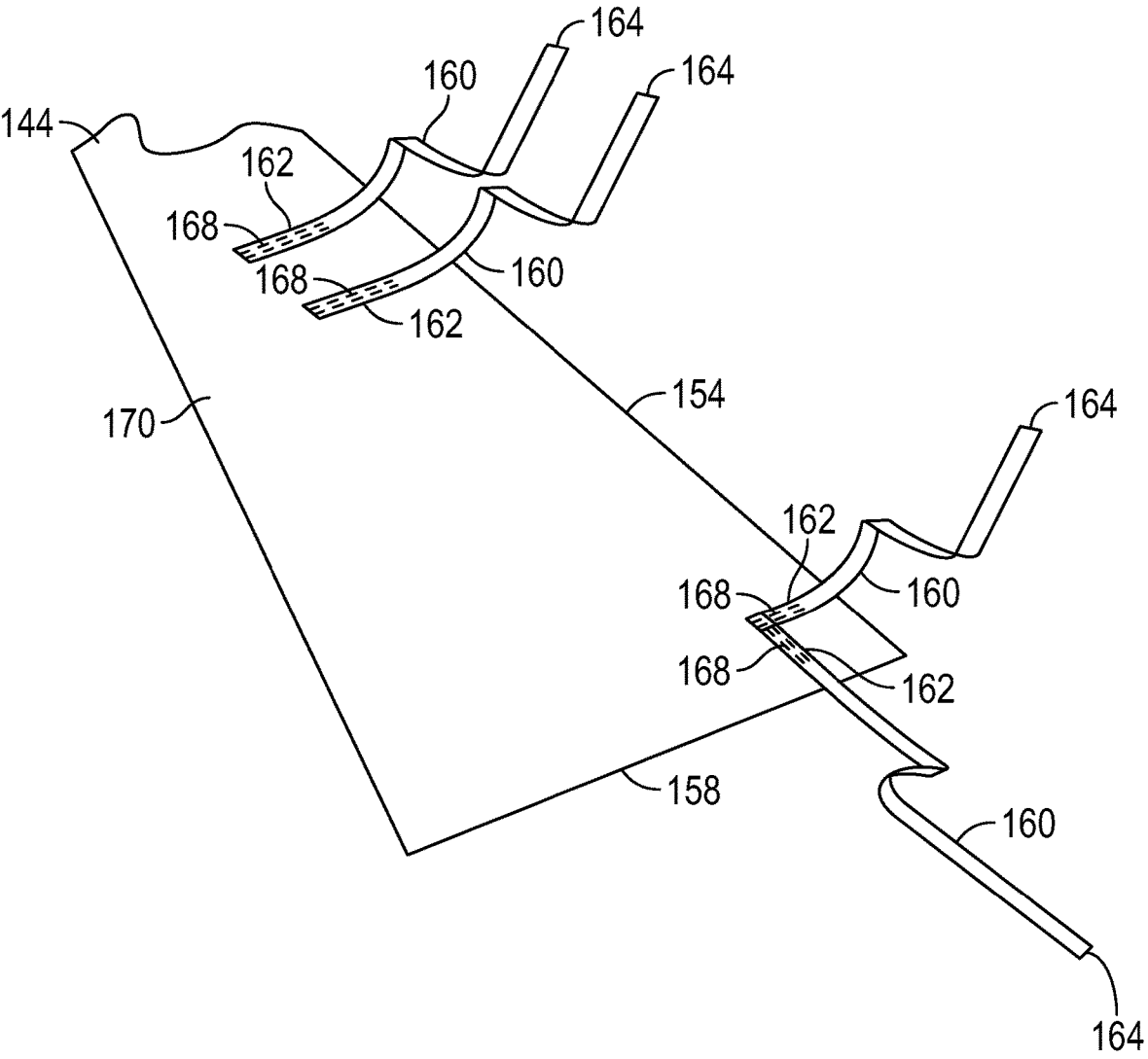
FIG. 3B is a pictorial representation of an underside of an edge panel and securement straps of a cover-after grain tarp.
Figure 4:
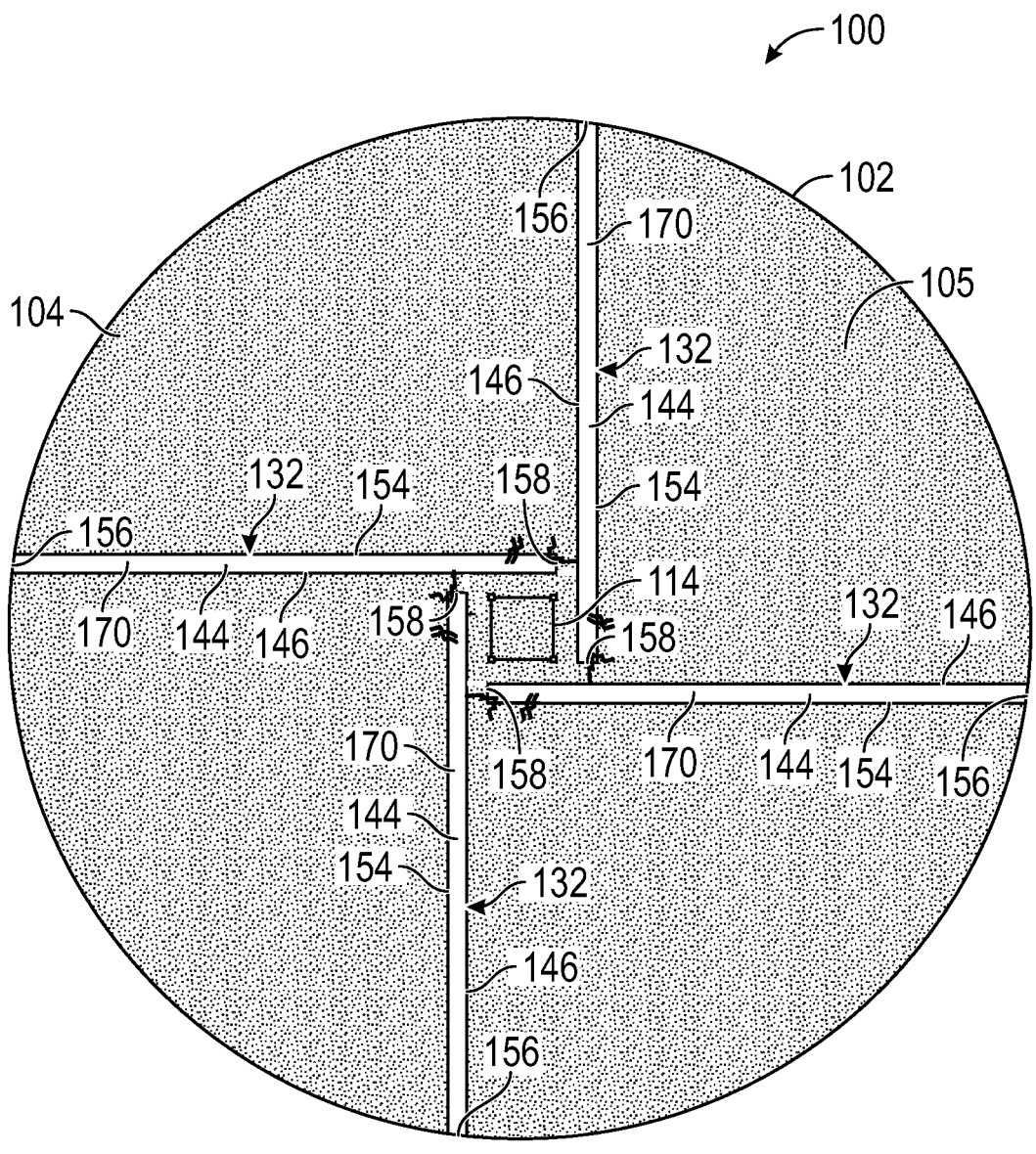
FIG. 4 is a pictorial representation showing a top view of a cover-after grain tarp and installation atop a grain pile with a center tower structure in accordance with an exemplary aspect of the present disclosure.
Figure 9:
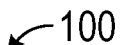
FIG. 9 is an enlarged view taken along line 9-9 in FIG. 8 of edge panel portions of a cover-after grain tarp and securement straps secured to structural members of a center tower structure in accordance with an exemplary aspect of the present disclosure.
Figure 10:
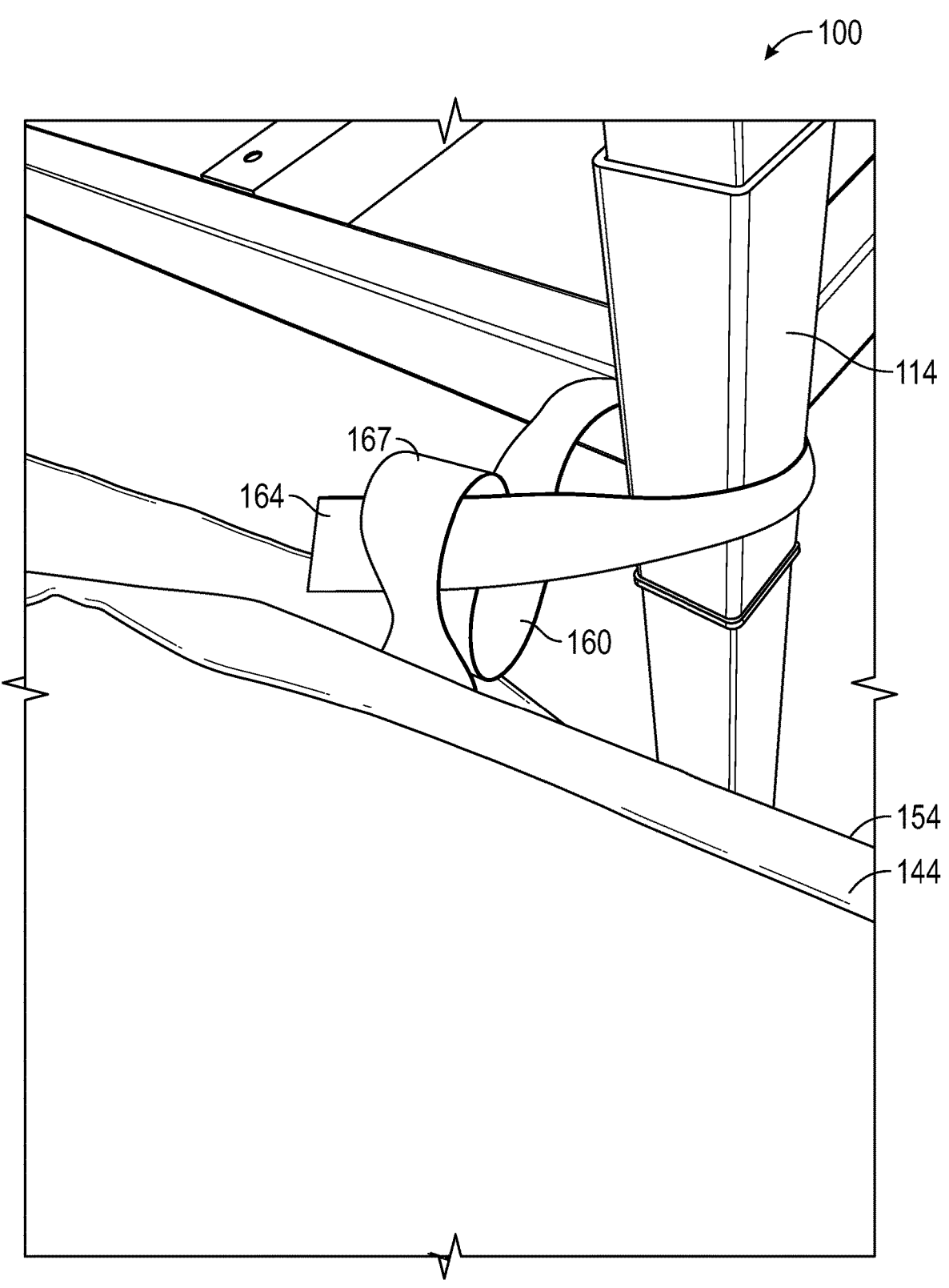
FIG. 10 is a pictorial representation of an edge panel of a cover-after grain tarp and a securement strap partially tied to a structural member of a center tower structure in accordance with an exemplary aspect of the present disclosure.
Figure 11:
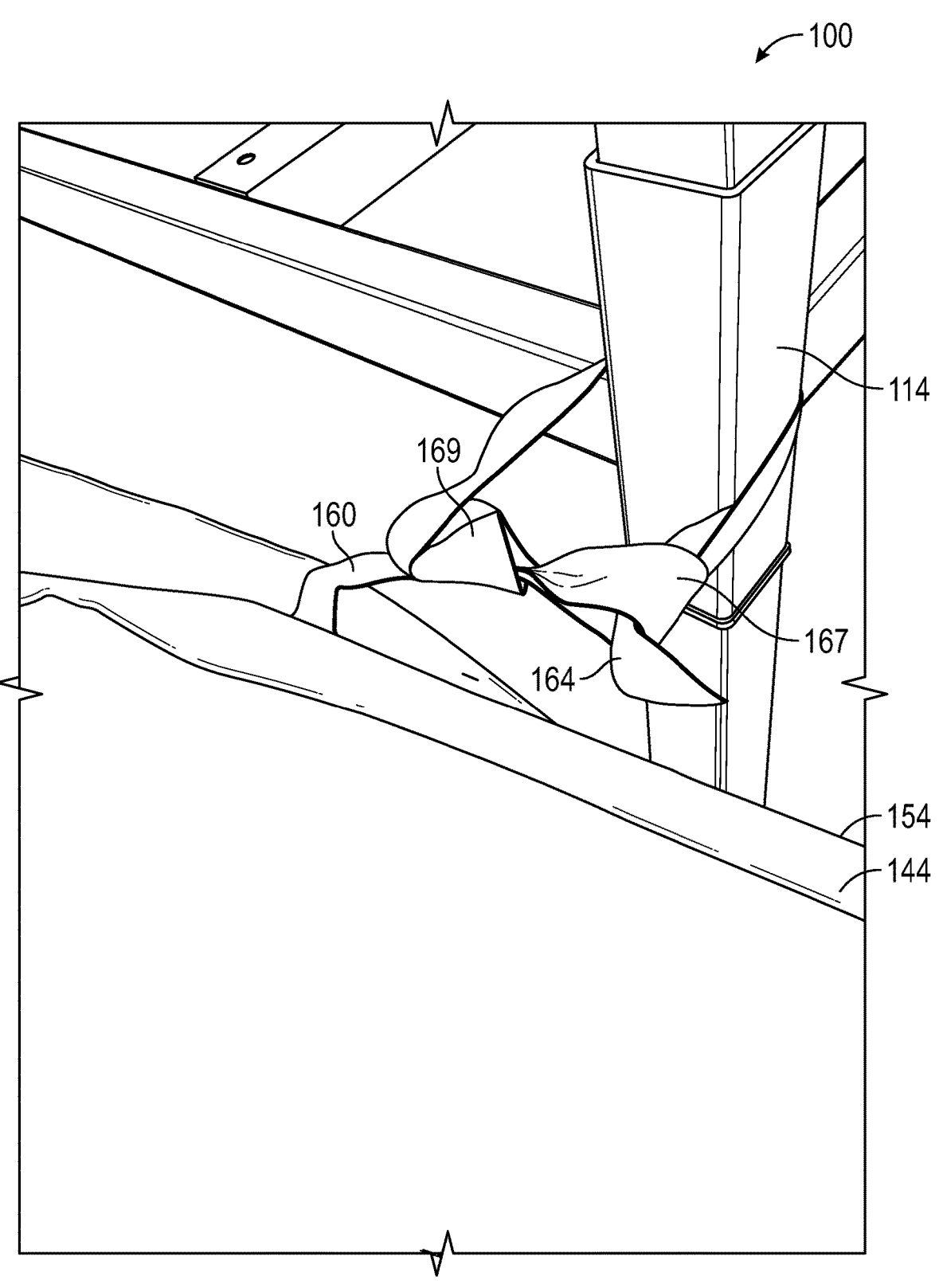
FIG. 11 is another pictorial representation of an edge panel of a cover-after grain tarp and securement strap tied to a structural member of a center tower structure in accordance with an exemplary aspect of the present disclosure.

As best shown in FIG. 3A and FIG. 3B, edge panel 144 includes securement straps 160. Each securement strap 160 has a secured end 162 and a free end 164. Secured end 162 of each securement strap 160 is attached to edge panel 144 (see also FIG. 12, Step 182). When cover-after grain tarp 100 is installed, free end 164 of each securement strap 160 is tied to one or more structural tower members 114, as best illustrated in FIGS. 9-11. In at least one aspect, secured end 162 is sewn to tarp material, such as with a stitching 168 material, illustrated, for example, in FIGS. 10-11 (see also FIG. 12, Step 182). At least one securement strap 160 has its secured end 162 attached to edge panel 144 generally parallel to and proximate inner panel edge 154 with its free end 164 extending generally outward from and perpendicular to inner panel terminal edge 158 of edge panel 144. At least one securement strap 160 has its secured end 162 attached to edge panel 144 generally parallel to and proximate inner panel terminal edge 158 with its free end 164 extending generally outward from and perpendicular to inner panel edge 154 of edge panel 144. The at least one securement straps 160 can each be configured having an angle relative inner panel edge 154 and inner panel terminal edge 158 of less than 90 degrees and greater than 45 degrees. A pair of securement straps 160 have their secured ends 162 attached to edge panel 144 generally angled to and proximate inner panel edge 154 with their free ends 164 extending generally outward from and angled to inner panel edge 154 of edge panel 144. The pair of securement straps 160 can have an angle relative to inner panel edge 154 of less than 90 degrees and greater than 45 degrees. The pair of securement straps 160 can also configured perpendicular to inner panel edge 154 and parallel to inner panel terminal edge 158. In at least one aspect, free ends 164 of securement straps 160 extend outward from an underside 170 of edge panel 144 to prevent malalignment of stresses on edge panel 144, inner panel edge 154, inner panel terminal edge 158, and adjoining tarp panels 142. The present disclosure contemplates that free ends 164 of securement straps 160 can extend from the topside 172 of edge panel 144, if and as needed. Supporting straps 166 for aiding in the attachment of secured ends 162 of securement straps 160 to edge panel are illustrated in FIG. 3B, which shows the underside 170 of edge panel 144 for each tarp section 132. Secured ends 162 of securement straps can be attached to edge panel 144 by sandwiching edge panel 144 between secured ends 162 and supporting straps 166 as best illustrated in FIG. 3A and FIG. 3B. Stitching 168 (see FIG. 3B) can be sewn through secured ends 162 and edge panel 144 for attaching securement straps 160 to edge panel 144. The present invention contemplates securement straps attached to tarp panels 142, if and as needed, such as in the case, if and when, there is no edge panel 144 employed in one or more tarp sections 132.

As best shown in FIGS. 4-8, tarp sections 132 are assembled on top of grain pile 105 to form body 106 of cover-after grain tarp 100. Prior to assembly atop grain pile 105, tarp sections 132 can be accordion folded along tarp panel seams 148 with end panel 145 being located on top of the accordion fold and edge panel 144 being located on the bottom of the accordion fold (see also FIG. 12, Step 184). Topside 172 of edge panel 144 faces upward when edge panel 144 is located on the bottom of the accordion folded tarp section 132. Edge panel 144 is pulled out from its position at the bottom of the accordion folded tarp section 132, folded over on top of the end panel 145 (underside 170 of edge panel 144 faces upward), and rested atop of end panel 145 at the top of the accordion folded tarp section 132 (see also FIG. 4 & FIG. 12, Step 186) to facilitate and ease the transportation of each tarp section 132 atop grain pile 105, securement of edge panel 144 to structural tower members 114 and unfolding of accordion folded tarp panels atop grain pile 105. Securement straps 160 can be used to transport tarp sections 132 onto grain pile 105 and tug tarp sections up grain pile 105 to position securement straps 160 and edge panel 144 adjacent structural tower members 114 as illustrated, for example, in FIG. 4 (see also FIG. 12, Step 188). With tarp sections 132 positioned atop grain pile 105, edge panels 144 are unfolded from atop end panel 145 and into position closely adjacent structural tower members 114 as illustrated, for example, in FIG. 5 (see also FIG. 12, Step 190). Securement straps are positioned generally adjacent structural tower members 114 when tarp sections 132 are positioned atop grain pile 105 (see also FIG. 12, Step 192). Securement straps 160 are tied to structural tower members 114 as illustrated, for example, in FIGS. 9-11. In one aspect, each edge panel 144 includes at least one securement strap 160 tied to one of structural tower members 114 and at least one other securement strap 160 tied to a separate one of structural tower members 114 as illustrated, for example, FIG. 9. In one aspect, each edge panel 144 includes at least two securement straps 160 tied to one of structural members 114 and at least another two securement straps 160 tied to a separate one of structural tower members 114 as illustrated, for example, FIG. 9. In one aspect, each edge panel 144 includes at least two securement straps 160 with one of the two straps tied to one of structural tower members 114 and the other strap tied to securement strap 160 of an adjoining edge panel 144 and another two securement straps 160 with one of the another two straps tied to one of structural tower members 114 and the other strap tied to another securement strap 160 of an adjoining edge panel 144. Securement straps are tied to structural tower members 114 as shown, for example, in FIG. 10 and FIG. 11, by creating knot 169 and tying off a loop 167 in a portion of the strap of the free end, passing the end portion of the free end 164 of the strap around structural tower member 114, threading free end 164 of the strap back through the loop 167, and tying off free end 164 to a portion of the strap before the loop 167.

Figure 5:
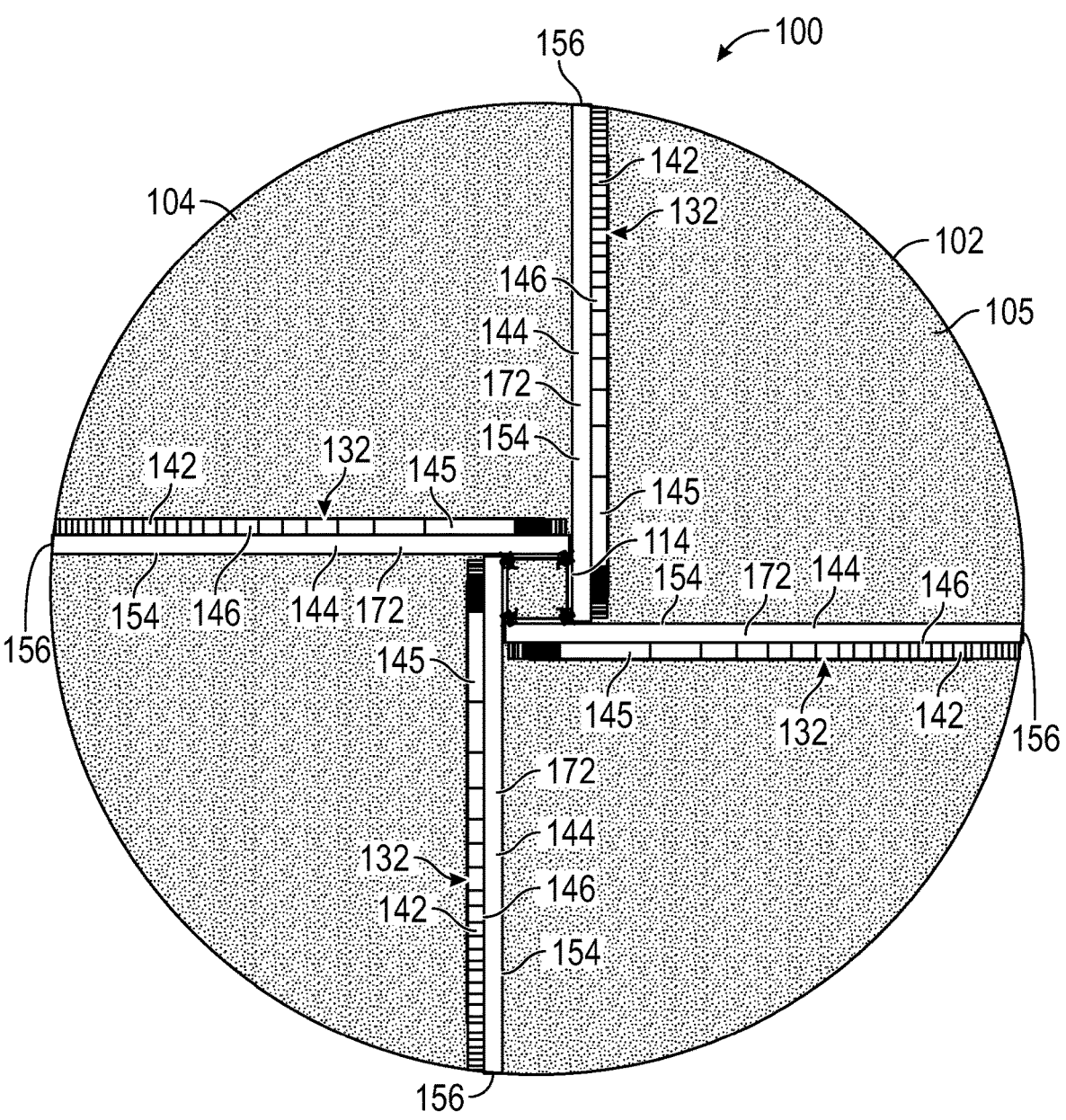
FIG. 5 is another pictorial representation showing a top view of a cover-after grain tarp and installation atop a grain pile with a center tower structure in accordance with an exemplary aspect of the present disclosure.
Figure 6:
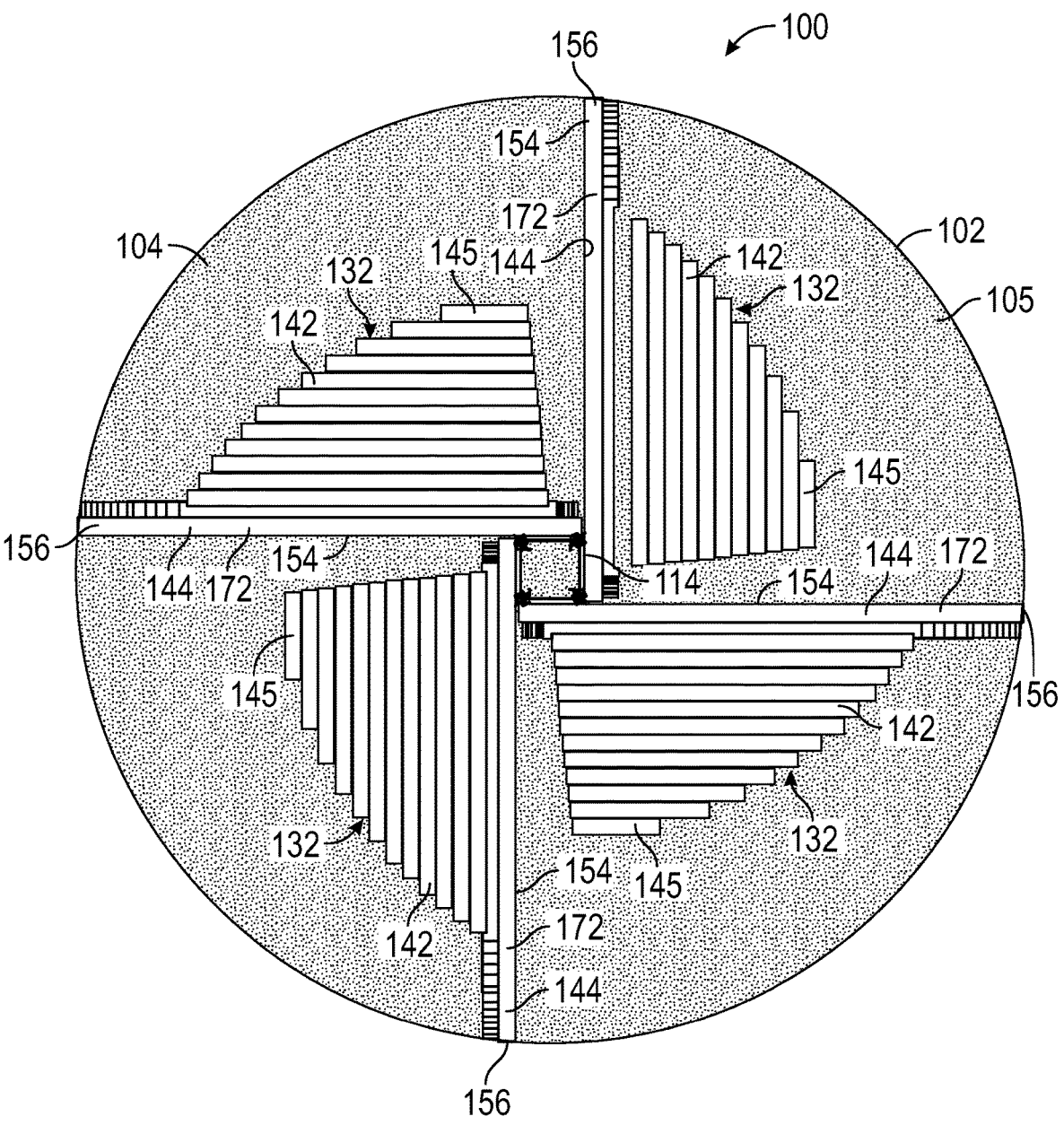
FIG. 6 is another pictorial representation showing a top view of a cover-after grain tarp and installation atop a grain pile with a center tower structure in accordance with an exemplary aspect of the present disclosure.
Figure 7:
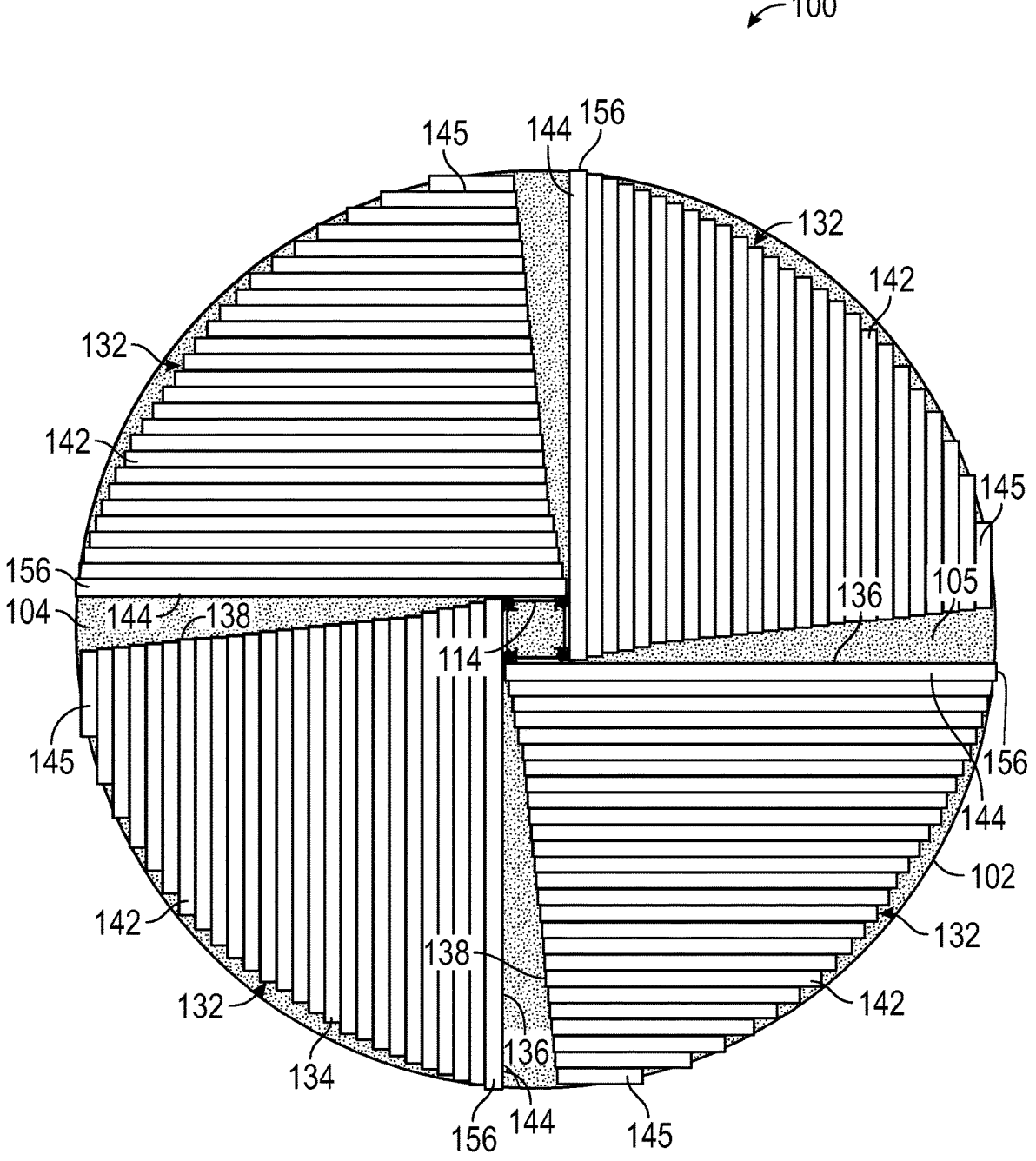
FIG. 7 is another pictorial representation showing a top view of a cover-after grain tarp in an unfurled position and installation of the cover-after grain tarp atop a grain pile with a center tower structure in accordance with an exemplary aspect of the present disclosure.

Tarp sections 132 positioned atop grain pile 105 and having edge panels 144 secured to structural tower members 114 as illustrated, for example, in FIG. 5, are unfurled from their accordion folded position by pulling end panels 145 toward barrier wall 102 (see also FIG. 12, Step 194). End panels 145 of each tarp section 132 are pulled until each tarp section 132 is completely unfurled whereby end panels 145 and section outer edges 134 of each tarp section are positioned adjacent or even partially overhang barrier wall 102 as illustrated, for example, in FIG. 7 (see also FIG. 12, Step 196). Section converging edges 138 of each tarp section 132 are also position adjacent edge panels 144 of adjoining tarp sections 132 as illustrated, for example, in FIG. 8 (see also FIG. 13, Step 198). Section outer edges 134 of each tarp section 132 are aligned with barrier wall 102 (see also FIG. 13, Step 200).

Figure 1B:
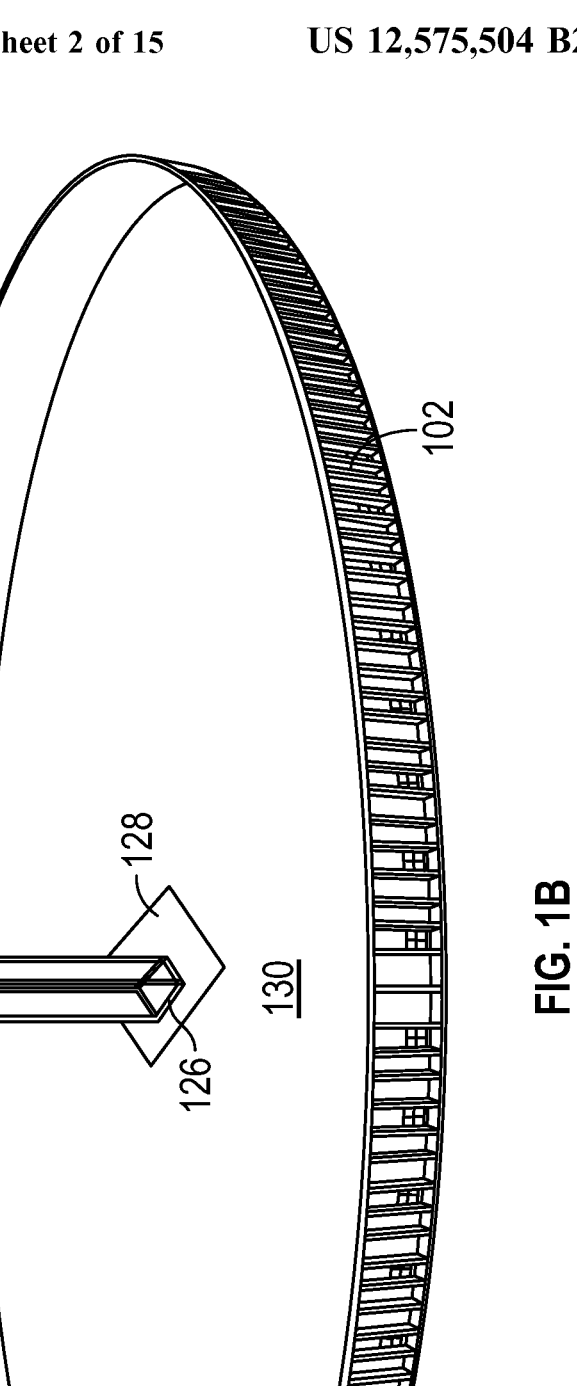
FIG. 1B is a pictorial representation of FIG. 1A without a cover-after grain tarp for illustrating structural tower members supporting structural conveyor members of a grain conveyor within a grain bunker.
Figure 1B:
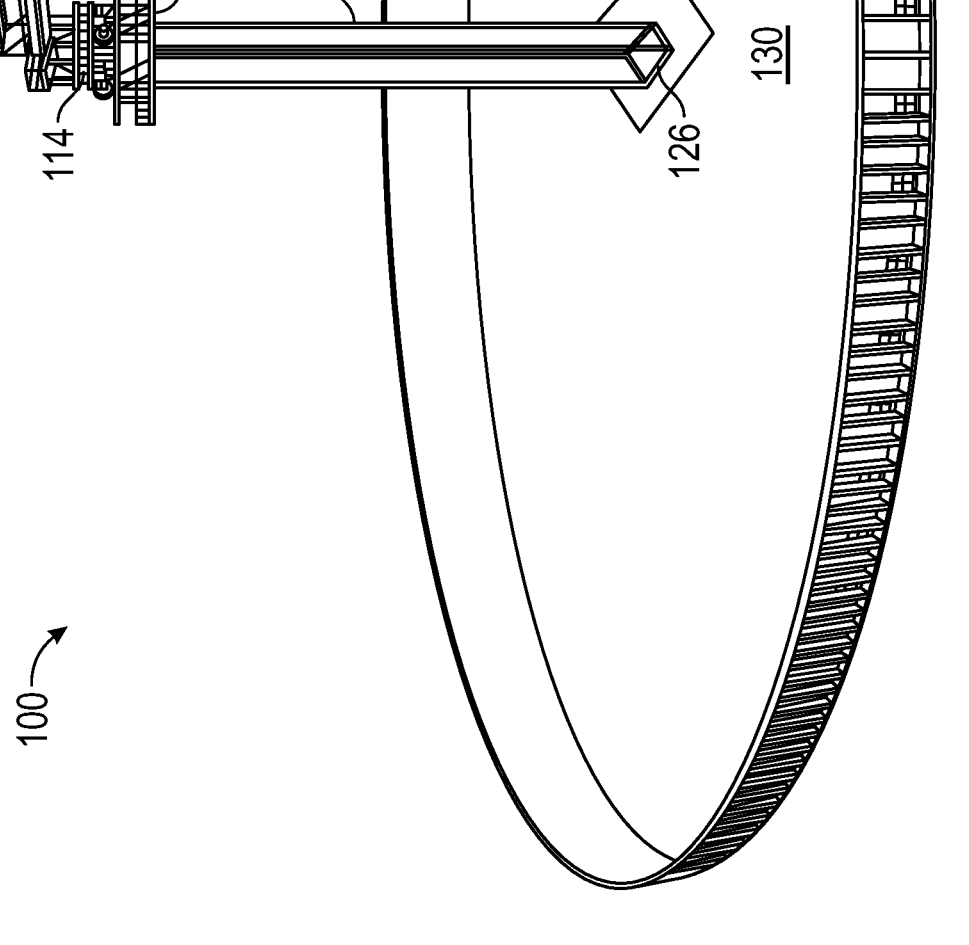
Figure 8:
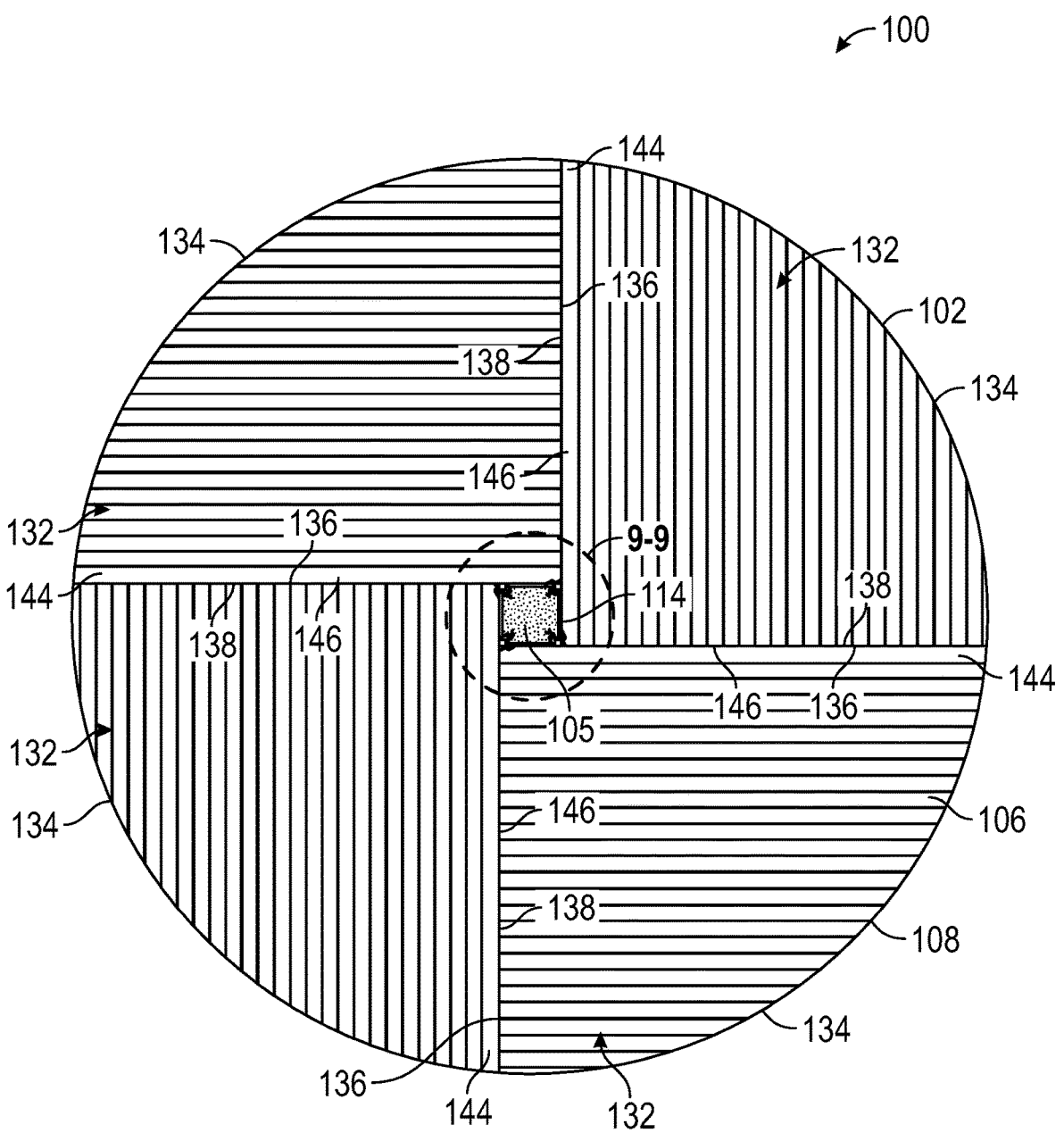
FIG. 8 is a pictorial representation showing a top view of joined sections of an installed cover-after grain tarp in accordance with an exemplary aspect of the present disclosure.

As best shown in FIG. 1A and FIG. 8, tarp sections 132 are connected to form body 106 of cover-after grain tarp 100. In one aspect, edge panels 144 of tarp sections 132 are connected to converging edge sections 138 of adjoining tarp sections 132 to form body 106 of cover-after grain tarp 100. Section converging edge 136 of one tarp section 132 is connected to section converging edge 138 of another tarp section 132 by a tarp panel transition seam 146 in the case where edge panels 144 are a different material from tarp panels 142 in each tarp section 132 (see also FIG. 13, Step 202). The present disclosure contemplates that section converging edge 136 of one tarp section 132 is connected to section converging edge 138 of another tarp section 132 by a tarp panel seam 148 in the case where edge panels 144 are the same material as the tarp panels 142 in each tarp section 132. In one aspect, tarp panel transition seam 146 is: (1) disposed in tarp sections 132 generally along and proximate to or at inner panel terminal edges 158 of edge panel 144, inner panel terminal edges 158 of adjoining tarp panels 142, and inner panel terminal edges 158 of adjoining end panel 145; and (2) disposed in adjoining tarp sections 132 generally along and proximate to or at outer panel edge 152 of edge panel 144. In at least one configuration of body 106 of cover-after grain cover 100, tarp panel transition seam 146 traverses: (1) generally between outer panel terminal edge 156 and inner panel terminal edge 158 of edge panel 144; and (2) generally between inner panel edge 154 of edge panel 144 and outer panel edge 152 of end panel 145. Outer terminal edge 108 of body 106 of cover-after grain tarp 100 can be secured to barrier wall 102 with battening (not shown) (see also FIG. 13, Step 204).

In a traditional grain cover that includes a yoke, only a few tarp panels of each tarp section are connected to the yoke and the yoke is connected to the structural tower members. Thus, the load of the tarp body is carried/transferred by the few panels of each tarp section and the seam between the few panels connected to the yoke and to the structural tower members. Yoke material is often a different material, more expensive, more difficult to manufacture and assemble than panel material to adequately support the load shared between a few panels of each tarp section and the yoke. Nevertheless, failures often occur at the seam or material adjacent the seam between the few panels of each tarp section and the yoke. As best shown in FIG. 8, edge panel 144 is connected along tarp panel transition seam 146 to each panel 142 (inclusive of edge panel 144 and end panel 145) of the adjoining tarp section 132. Thus, the load of cover-after grain tarp 100 connected to structural tower members 114 is distributed evenly across all panels 142 (inclusive of edge panel 144 and end panel 145) of the adjoining tarp section 132. No single tarp panel 142 or a fewer number of tarp panels 142 than those making up a tarp section 132 carry the load, thereby evenly distributing the load of the tarp 100 from structural tower members 114 across the entirety of body 106.

The disclosure is not to be limited to the particular aspects described herein. In particular, the disclosure contemplates numerous variations in a cover-after grain tarp or yokeless grain tarp 100. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of aspects, processes, or methods of the disclosure. It is understood that any other modifications, substitutions, and/or additions can be made, which are within the intended spirit and scope of the disclosure.

What is claimed is:

1. A cover-after grain tarp, comprising:
   a tarp body having a plurality of tarp sections joined together at one or more transition seams, each tarp section comprising a plurality of tarp panels having an outer terminal edge spaced between opposing converging edges;
   an edge panel of each of the plurality of tarp sections is secured along a transition seem to a converging edge of an adjoining one of the plurality of tarp panels in each of the plurality of tarp sections;
   wherein the edge panel is configured for securing to one or more structural members of a tower structure at a grain storage location.

2. The cover-after grain tarp of claim 1, wherein the edge panel has a length exceeding the length of the plurality of tarp panels in a tarp section.

3. The cover-after grain tarp of claim 1, wherein the edge panel comprises a separate type of material from the plurality of tarp panels.

4. The cover-after grain tarp of claim 1, wherein an outer converging edge of the edge panel of each of the plurality of tarp sections is secured at a transition seam along one of the opposing converging edges of an adjoining one of the plurality of tarp sections.

5. The cover-after grain tarp of claim 1, wherein the edge panel includes one or more securement straps generally disposed proximate a converging inner terminal edge of each edge panel for securing each edge panel of each of the plurality of tarps sections to the one or more structural members of the tower structure at the grain storage location.

6. The cover-after grain tarp of claim 1, wherein one of the opposing converging edges comprises an outer converging edge of the edge panel.

7. The cover-after grain tarp of claim 1, wherein one of the opposing converging edges comprises converging inner terminal edges of the plurality of tarp panels.

8. The cover-after grain tarp of claim 1, wherein the plurality of tarp panels are parallel.

9. The cover-after grain tarp of claim 1, wherein an angle between the opposing converging edges of each of the plurality of tarp sections is less than 90 degrees.

10. A yokeless cover-after grain tarp, comprising:
   a tarp body having a plurality of tarp sections joined together at one or more transition seams, each tarp section comprising a plurality of tarp panels having an outer terminal edge spaced between opposing converging edges;
   an edge panel of each of the plurality of tarp sections secured along a transition seam to an adjoining one of the plurality of tarp panels and the transition seam extending generally between the outer terminal edge and opposing converging edge of the adjoining one of the plurality of tarp panels;
   wherein the edge panel is configured for securing to one or more structural members of a tower structure at a grain storage location.

11. The yokeless cover-after grain tarp of claim 10, wherein an outer converging edge of the edge panel of each of the plurality of tarp sections is secured at a transition seam along one of the opposing converging edges of an adjoining one of the plurality of tarp sections.

12. The yokeless cover-after grain tarp of claim 10, wherein the edge panel comprises a continuous panel of a first tarp material and the adjoining one of the plurality of tarp panels comprises a continuous panel of a second tarp material.

13. The yokeless cover-after grain tarp of claim 10, wherein the edge panel includes one or more securement straps generally disposed at a converging inner terminal edge and outer converging edge of the edge panel for securing to the one or more structural members of the tower structure at the grain storage location.

14. The yokeless cover-after grain tarp of claim 10, wherein one of the opposing converging edges comprises an outer converging edge of the edge panel and another one of the opposing converging edges comprises converging inner terminal edges of the plurality of tarp panels.

15. The yokeless cover-after grain tarp of claim 10, wherein the plurality of tarp panels are parallel and an angle between the opposing converging edges is less than 90 degrees.

16. A method for a yokeless cover-after grain tarp, comprising:

providing a tarp body having a plurality of tarp sections comprising a plurality of tarp panels having an outer terminal edge spaced between opposing converging edges and each of the plurality of tarp sections having a transition seam connecting an edge panel to an adjoining one of the plurality of tarp panels;

securing the edge panel to one or more structural members of a center tower structure at a grain storage location for securing the tarp body.

17. The method of claim 16, further comprising:

securing the edge panel of each of the plurality of tarp sections to one of the opposing converging edges of an adjoining one of the plurality of tarp sections for assembling the tarp body.

18. The method of claim 16, further comprising:

pulling an outermost tarp panel of the plurality of tarp panels away from the edge panel for expanding the tarp section atop the grain pile.

19. The method of claim 16, wherein the securing step comprises attaching one or more securement straps along a converging inner terminal edge of the edge panel and an outer converging edge of the edge panel to the one or more structural members of the center tower structure.

20. The method of claim 16, further comprising:

accordion folding the plurality of tarp panels of each of the plurality of tarp sections together before installing at the grain storage location; and unfolding the edge panel atop a grain pile for revealing an outermost tarp panel of the plurality of tarp panels for installing the tarp body atop the grain pile.

* * * * *